United States Patent
Kakehi

(10) Patent No.: US 10,362,128 B2
(45) Date of Patent: Jul. 23, 2019

(54) SERVER DEVICE, INFORMATION PROCESSING SYSTEM, NON-TRANSITORY COMPUTER READABLE MEDIUM, AND INFORMATION PROCESSING METHOD

(71) Applicant: FUJI XEROX CO., LTD., Tokyo (JP)

(72) Inventor: Rumiko Kakehi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 180 days.

(21) Appl. No.: 15/352,333

(22) Filed: Nov. 15, 2016

(65) Prior Publication Data

US 2017/0359430 A1 Dec. 14, 2017

(30) Foreign Application Priority Data

Jun. 9, 2016 (JP) .................... 2016-115424

(51) Int. Cl.
*G06F 15/16* (2006.01)
*H04L 29/08* (2006.01)
*H04L 29/06* (2006.01)

(52) U.S. Cl.
CPC .............. *H04L 67/22* (2013.01); *H04L 67/02* (2013.01); *H04L 67/42* (2013.01); *H04L 29/06* (2013.01); *H04L 29/08072* (2013.01)

(58) Field of Classification Search
CPC ......... H04L 67/22; H04L 67/42; H04L 67/02; H04L 29/06; H04L 29/08072
See application file for complete search history.

(56) References Cited

U.S. PATENT DOCUMENTS

| 8,115,619 | B2 * | 2/2012 | Ikeda | G06F 17/30011 340/539.13 |
| 8,700,723 | B2 * | 4/2014 | Bakke | G09G 5/14 709/208 |
| 2002/0188565 | A1 * | 12/2002 | Nakamura | G06Q 20/108 705/42 |
| 2003/0005456 | A1 * | 1/2003 | Naganuma | G06F 8/61 725/93 |

(Continued)

FOREIGN PATENT DOCUMENTS

| JP | 2010-277229 A | 12/2010 |
| JP | 2011-253309 A | 12/2011 |
| JP | 2013-210952 A | 10/2013 |

*Primary Examiner* — Razu A Miah
(74) *Attorney, Agent, or Firm* — Oliff PLC

(57) ABSTRACT

A server device includes first and second acquisition units, a memory, an analyzer, a generating unit, and a transmitter. The first acquisition unit acquires first history information about an operation performed during displaying of a first screen in at least one client device and first attribute information about at least one user thereof. The memory stores the two acquired pieces of information. When receiving an acquisition request for a new screen from a client device of the at least one client device, the second acquisition unit acquires second attribute information about a first user using the client device. The analyzer analyzes the two stored pieces of information to specify an operation characteristic of a second user having an attribute indicated by the second attribute information. The generating unit generates a second screen according to the specified operation. The transmitter transmits screen data indicating the second screen to the client device.

11 Claims, 9 Drawing Sheets

(56) References Cited

U.S. PATENT DOCUMENTS

| | | | | | |
|---|---|---|---|---|---|
| 2004/0116117 | A1* | 6/2004 | Ahvonen | ............... | H04L 29/06 455/432.3 |
| 2008/0126567 | A1* | 5/2008 | Wilson | .................. | G06Q 30/02 709/248 |
| 2008/0172373 | A1* | 7/2008 | Jenson | ............... | G06F 17/30876 |
| 2008/0183819 | A1* | 7/2008 | Gould | .................. | G06Q 10/10 709/205 |
| 2009/0019394 | A1* | 1/2009 | Sekimoto | ........... | H04N 5/44543 715/811 |
| 2010/0131655 | A1* | 5/2010 | Berry | ...................... | H04L 67/14 709/227 |
| 2010/0185747 | A1* | 7/2010 | Ruhlen | ................ | G06F 9/5055 709/219 |
| 2011/0010692 | A1* | 1/2011 | Hattori | ..................... | G06F 8/38 717/132 |
| 2011/0178838 | A1* | 7/2011 | Ravichandran | ........ | G06Q 10/06 705/7.29 |
| 2012/0066252 | A1* | 3/2012 | Hayashi | ................ | G06Q 10/00 707/769 |
| 2012/0266098 | A1* | 10/2012 | Webber | ............... | G06Q 10/107 715/778 |
| 2013/0212162 | A1* | 8/2013 | Somadder | .............. | H04L 67/42 709/203 |
| 2013/0304813 | A1* | 11/2013 | Chun | ..................... | H04L 67/42 709/203 |
| 2014/0115114 | A1* | 4/2014 | Garmark | ................ | H04L 65/60 709/219 |
| 2014/0181182 | A1* | 6/2014 | Lai | .......................... | H04L 67/42 709/203 |
| 2014/0280457 | A1* | 9/2014 | Anton | .................. | G06F 16/256 709/202 |

* cited by examiner

| TIME | OPERATION CONTENT | CONNECTION-DESTINATION INFORMATION | FILE |
|---|---|---|---|
| ... | ... | ... | ... |
| 2016/4/1 10:00 | DOWNLOAD | https://example.aaa | template.xdw |

| HISTORY INFORMATION | | | | ATTRIBUTE INFORMATION | ~231 |
|---|---|---|---|---|---|
| TIME | OPERATION CONTENT | CONNECTION-DESTINATION INFORMATION | FILE | DIVISION INFORMATION | POST INFORMATION |
| ... | ... | ... | ... | ... | ... |
| 2016/4/1 9:00 | BROWSE | https://example.bbb | — | DEVELOPMENT | MANAGER |
| 2016/4/1 10:00 | DOWNLOAD | https://example.aaa | template.xdw | SALES | REGULAR |

FIG. 11

| OPERATION CONTENT | CONNECTION-DESTINATION INFORMATION | FILE | DIVISION INFORMATION | POST INFORMATION | NUMBER OF OPERATIONS |
|---|---|---|---|---|---|
| DOWNLOAD | https://example.aaa | template.xdw | SALES | REGULAR | 200 |
| | | | DEVELOPMENT | MANAGER | 2 |
| | | | ... | ... | ... |
| BROWSE | https://example.bbb | — | DEVELOPMENT | MANAGER | 150 |
| | | | DEVELOPMENT | REGULAR | 120 |
| | | | SALES | REGULAR | 0 |
| | | | ... | ... | ... |
| ... | ... | ... | ... | ... | ... |

| ICON ID | DIVISION INFORMATION | POST INFORMATION | NUMBER OF USAGES | NUMBER OF DELETIONS |
|---------|----------------------|------------------|------------------|---------------------|
| ICON 47 | SALES | REGULAR | 2 | 10 |
|  | ... | ... | ... | ... |
| ... | ... | ... | ... | ... |

~233

SERVER DEVICE, INFORMATION PROCESSING SYSTEM, NON-TRANSITORY COMPUTER READABLE MEDIUM, AND INFORMATION PROCESSING METHOD

CROSS-REFERENCE TO RELATED APPLICATIONS

This application is based on and claims priority under 35 USC 119 from Japanese Patent Application No. 2016-115424 filed Jun. 9, 2016.

BACKGROUND

Technical Field

The present invention relates to server devices, information processing systems, non-transitory computer readable media, and information processing methods.

SUMMARY

According to an aspect of the invention, there is provided a server device including a first acquisition unit, a memory, a second acquisition unit, an analyzing unit, a generating unit, and a transmitting unit. The first acquisition unit acquires first history information and first attribute information. The first history information indicates a history of an operation performed during displaying of a first screen in at least one client device. The first attribute information indicates an attribute of at least one user using the at least one client device. The memory stores the acquired first history information and the acquired first attribute information. The second acquisition unit acquires second attribute information indicating an attribute of a first user using a client device included in the at least one client device when the second acquisition unit receives an acquisition request for a new screen from the client device. The analyzing unit analyzes the first history information and the first attribute information stored in the memory so as to specify an operation characteristic of a second user included in the at least one user and having an attribute indicated by the acquired second attribute information. The generating unit generates a second screen in accordance with the specified operation. The transmitting unit transmits screen data indicating the generated second screen to the client device.

BRIEF DESCRIPTION OF THE DRAWINGS

An exemplary embodiment of the present invention will be described in detail based on the following figures, wherein:

FIG. 11 illustrates an example of an analysis result of the history information;

DETAILED DESCRIPTION

1. Configuration

Figure 1:
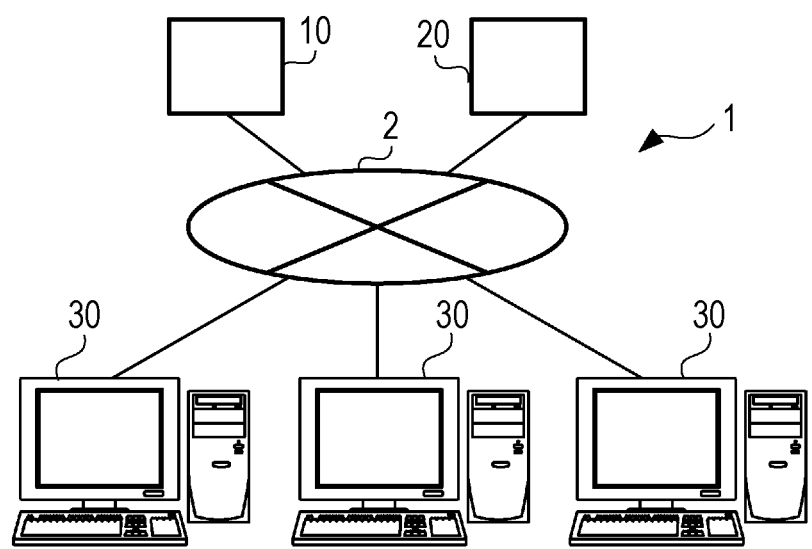
FIG. 1 illustrates an example of an information processing system.

FIG. 1 illustrates an example of an information processing system 1 according to an exemplary embodiment. The information processing system 1 includes a management device 10, a server device 20, and multiple client devices 30. The management device 10, the server device 20, and the multiple client devices 30 are connected via a communication line 2. The communication line 2 is, for example, the Internet.

The management device 10 manages user information. This user information contains, for example, user IDs given to users and attribute information of the users. The server device 20 provides a task screen to the multiple client devices 30. This task screen is used for collectively managing files used in a task and processes performed in the task. Each client device 30 displays the task screen provided from the server device 20. The client devices 30 are used by respective users.

Figure 2:
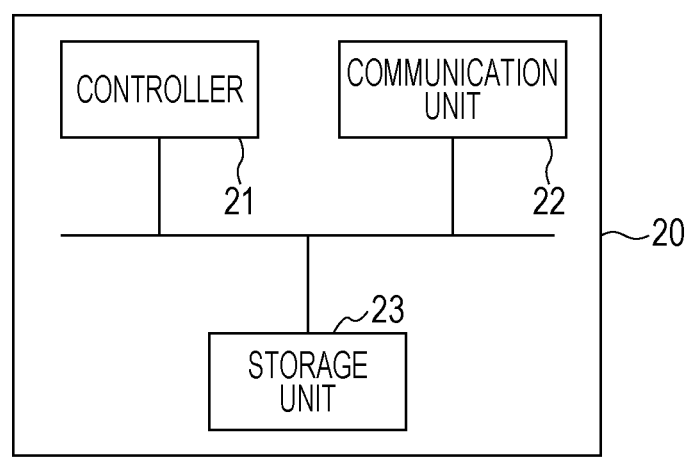
FIG. 2 illustrates a hardware configuration of a server device.

FIG. 2 illustrates a hardware configuration of the server device 20. The server device 20 includes a controller 21, a communication unit 22, and a storage unit 23. The controller 21 is constituted of, for example, a central processing unit (CPU) and a memory. The controller 21 controls each unit of the server device 20. The communication unit 22 is connected to the communication line 2. The communication unit 22 communicates with the multiple client devices 30 via the communication line 2. The storage unit 23 is constituted of, for example, a hard disk. The storage unit 23 stores various types of data and programs.

Figure 3:
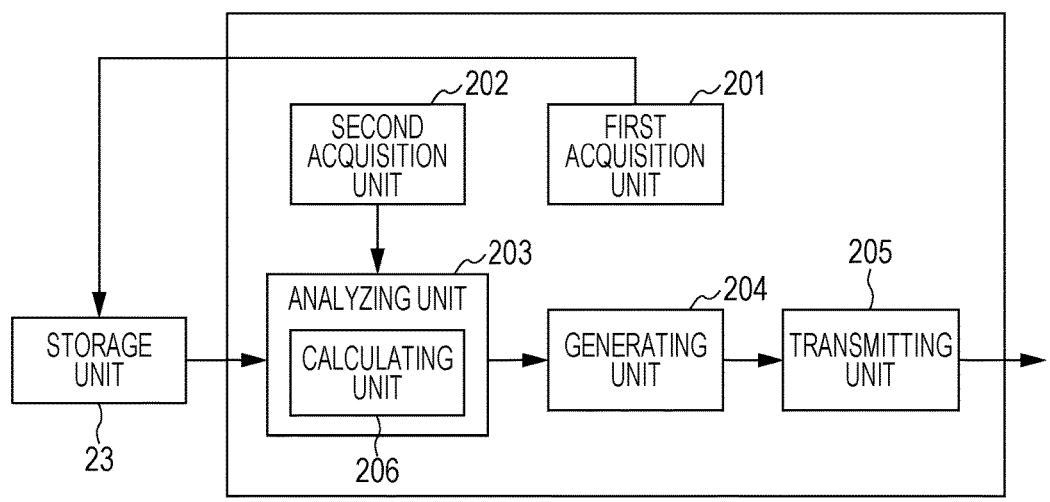
FIG. 3 illustrates a functional configuration of the server device.

FIG. 3 illustrates a functional configuration of the server device 20. The server device 20 functions as a first acquisition unit 201, a second acquisition unit 202, an analyzing unit 203, a generating unit 204, and a transmitting unit 205. These functions are realized by, for example, the CPU executing a program.

The first acquisition unit 201 acquires first history information indicating the history of an operation performed during displaying of a first screen in a client device 30 and first attribute information indicating an attribute of a user using the client device 30. In this example, the first screen is the task screen used in an operation. However, the first screen may be a screen with any contents so long as it is a screen used in an operation performed by the user. The expression "during displaying of the first screen" refers to a period from when the first screen is displayed to when the displaying of the first screen ends. The first screen does not have to be displayed in the foreground of the screen within this period. For example, the first screen may be displayed behind another screen or the first screen may be minimized. The attribute of the user includes, for example, the division to which the user belongs and the user's post. Alternatively, the attribute of the user may include an attribute other than the user's division and post.

The first history information and the first attribute information acquired by the first acquisition unit 201 are stored into the storage unit 23. The storage unit 23 is an example of a "memory" or "second memory" according to an exemplary embodiment of the present invention. If the second acquisition unit 202 receives a request for acquiring a new screen from a client device 30, the second acquisition unit 202 acquires second attribute information indicating an attribute of a first user using the client device 30.

The analyzing unit 203 analyzes the first history information and the first attribute information stored in the storage unit 23 and specifies an operation characteristic of a second user having the attribute indicated by the second attribute information. The analyzing unit 203 has a calculating unit 206. The calculating unit 206 calculates an index value according to the number of times at least one of the operations included in the history is performed by the second user based on the first history information and the first attribute information stored in the storage unit 23. This index value increases with increasing number of times the operation is performed. The index value may be, for example, the number of times the operation is performed, or may be the frequency at which the operation is performed. As another alternative, the index value may be a value obtained from the number of times the operation is performed.

The generating unit 204 generates a second screen in accordance with an operation specified by a specifying unit. For example, in a case where the history includes an operation with an index value calculated by the calculating unit 206 larger than or equal to a first threshold value, the second screen includes a first operation image related to this operation. The first operation image is used in, for example, an operation performed by a user. The first operation image is, for example, an icon. However, the first operation image may be any type of image, such as a thumbnail image or an operation button, so long as the image is used in an operation performed by a user.

The transmitting unit 205 transmits screen data indicating the second screen generated by the generating unit 204 to the client device 30. The transmitting unit 205 is an example of a "transmitting unit" or "third transmitting unit" according to an exemplary embodiment of the present invention.

Figure 4:
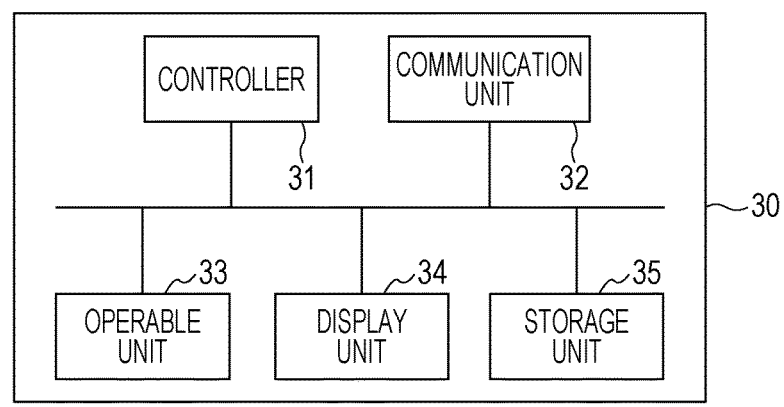
FIG. 4 illustrates a hardware configuration of a client device.

FIG. 4 illustrates a hardware configuration of each client device 30. The client device 30 includes a controller 31, a communication unit 32, an operable unit 33, a display unit 34, and a storage unit 35. The controller 31 is constituted of, for example, a CPU and a memory. The controller 31 controls each unit of the client device 30. The communication unit 32 is connected to the communication line 2. The communication unit 32 communicates with the management device 10 and the server device 20 via the communication line 2. The operable unit 33 is constituted of, for example, a mouse and a keyboard. The operable unit 33 is used for an operation performed by a user. The display unit 34 is constituted of, for example, a liquid-crystal display. The display unit 34 displays various types of information. The storage unit 35 is constituted of, for example, a hard disk. The storage unit 35 stores various types of data and programs.

2. Operation

It is assumed here that a task screen to be used for a purchase requesting process (referred to as "purchase-request task screen" hereinafter) is provided by the server device 20. This purchase requesting process is a process performed when, for example, an item is to be purchased in a company. The purchase requesting process involves processes such as requesting a quote, preparing an approval document, requesting approval, and ordering. These processes are performed by using multiple systems, such as a quoting system, a decision-approval system, and a purchasing system. For example, the purchase-request task screen is used for collectively managing files used in the purchase requesting process and processes performed in the purchase requesting process.

2.1. History-Information Transmitting Process

It is assumed here that a user A uses one of the client devices 30 to perform the purchase requesting process. The user A is a "regular" employee belonging to a "sales division". In the following description, the client device 30 used by the user A will be referred to as "client device 30A". Each component of the client device 30A will be indicated by adding a suffix "A" to the reference sign thereof.

Figure 5:
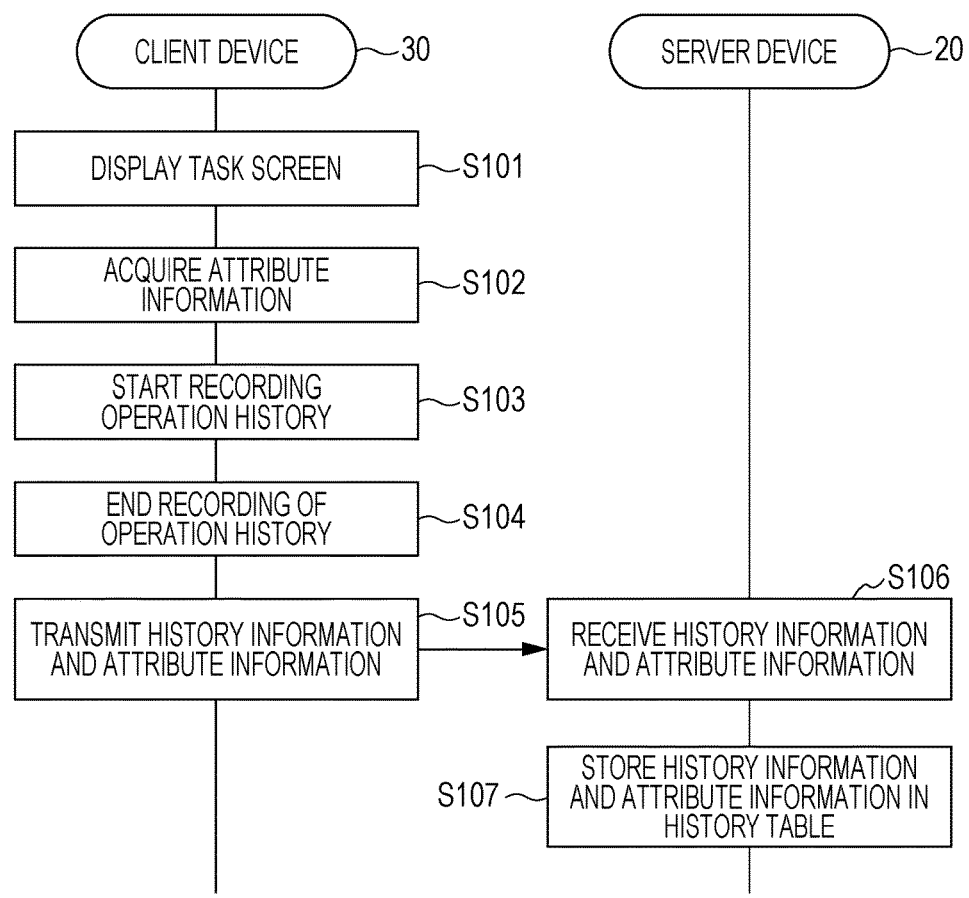
FIG. 5 is a sequence diagram illustrating a history-information transmitting process.

FIG. 5 is a sequence diagram illustrating a history-information transmitting process. In this process, the history of an operation performed by the user A during displaying of the purchase-request task screen is recorded, and history information indicating the history is transmitted to the server device 20. This process commences when, for example, the user A performs an operation for displaying the purchase-request task screen.

In step S101, the controller 31A causes the display unit 34A to display the purchase-request task screen. In this example, the storage unit 35A stores therein screen data indicating a standard purchase-request task screen provided from the server device 20 in advance. The display unit 34A displays the standard purchase-request task screen in accordance with the screen data stored in the storage unit 35A. The standard task screen is an example of a "first screen" according to an exemplary embodiment of the present invention.

Figures 6, 7:
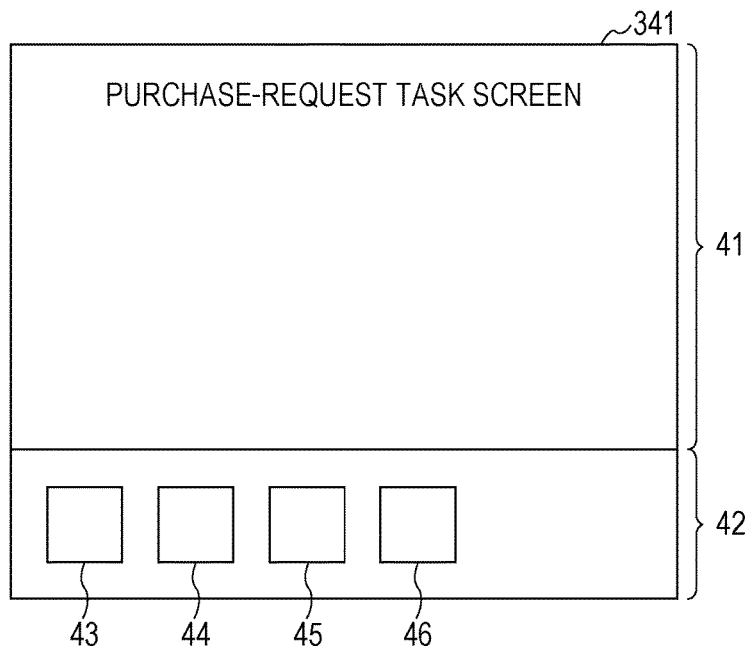
FIG. 6 illustrates an example of a standard task screen.
FIG. 7 illustrates an example of history information.

FIG. 6 illustrates an example of a standard purchase-request task screen 341. The task screen 341 has a file region 41 and a tool region 42. The file region 41 includes, for example, an icon linked with a file to be used in the purchase requesting process. This icon is used for selecting the file or for opening the file. The file opening operation is for displaying a document or image, which is the content of the file if the file is, for example, a document file or image file. The tool region 42 includes, for example, icon files (referred to as "tool icons" hereinafter) linked with processes to be performed in the purchase requesting process. Each of these tool icons is used for executing the corresponding process. The process may be a single process or a series of multiple processes.

As shown in FIG. 6, in this example, the tool region 42 includes tool icons 43 to 46. The tool icon 43 is linked with a quote-requesting-related process. The tool icon 43 is used for executing the quote-requesting-related process. The tool icon 44 is linked with an approval-document-preparation-related process. The tool icon 44 is used for executing the approval-document-preparation-related process. The tool icon 45 is linked with an approval-requesting-related process. The tool icon 45 is used for executing the approval-requesting-related process. The tool icon 46 is linked with an ordering-related process. The tool icon 46 is used for executing the ordering-related process.

Referring back to FIG. 5, in step S102, the controller 31A acquires attribute information of the user A from the management device 10. Specifically, the management device 10 stores a user ID and attribute information of each user in association with each other. This attribute information contains user's division information and user's post information. The user A uses the operable unit 33A to input the user ID of the user A to the client device 30A. The controller 31A accesses the management device 10 via the communication unit 32A so as to acquire the attribute information linked with the input user ID. In this example, the attribute information acquired contains user's division information of "sales division" and user's post information of "regular".

In step S103, the controller 31A starts recording the operation history. Specifically, every time an operation is performed by using the operable unit 33A while the task screen 341 is being displayed, the controller 31A generates history information 351 indicating the history of the operation. The history information 351 is stored into the storage unit 35A. The storage unit 35A is an example of a "first memory" according to an exemplary embodiment of the present invention.

FIG. 7 illustrates an example of the history information 351. The history information 351 contains time and date, operation content, connection destination information, and a file. The time and date indicates the time and date at which the operation is performed. The operation content includes information indicating the content of the operation. The connection destination information indicates an external connection destination. This connection destination information is contained in the history information 351 only when, for example, an operation for connecting to an external connection destination is performed. The file is data acquired from the external connection destination. This file is contained in the history information 351 only when, for example, an operation for acquiring the file from the external connection destination is performed.

In addition to a process performed via the standard task screen 341, the purchase requesting process may also include a process unique to the division to which the user belongs or to the user's post. For example, in the sales division, it may be necessary to attach a document when preparing an approval document. A template for this document is a file called "template.xdw" and is stored at a storage location indicated by the uniform resource locator (URL) "https://example.aaa". Therefore, when preparing an approval document, the user belonging to the sales division may download the file "template.xdw" from the storage location indicated by this URL.

In a development division, a price list of items often purchased for development is stored at a storage location indicated by the URL "https://example.bbb". Therefore, when requesting a quote, a user belonging to the development division may browse the price list stored at the storage location indicated by this URL.

It is assumed here that the user A uses the operable unit 33A to download the file "template.xdw" from the storage location indicated by the URL "https://example.aaa" at 10:00 on Apr. 1, 2016. In this case, as shown in FIG. 7, history information 351 containing the time and date "2016/4/1 10:00", the operation content "download", the connection-destination information "https://example.aaa", and the file "template.xdw" is generated. This history information 351 is stored into the storage unit 35A.

Referring back to FIG. 5, in step S104, when the displaying of the purchase-request task screen ends as a result of an operation performed by the user A, the controller 31A ends the recording of the operation history.

In step S105, the controller 31A transmits the history information 351 stored in the storage unit 35A and the attribute information acquired in step S102 to the server device 20 via the communication unit 32A. The controller 31A is an example of a "first transmitter" according to an exemplary embodiment of the present invention. In this example, the history information 351 shown in FIG. 7 and the attribute information containing the division information "sales division" and the post information "regular" are transmitted.

In step S106, the first acquisition unit 201 receives the history information 351 and the attribute information transmitted from the client device 30A via the communication unit 22. The history information 351 is an example of "first history information" according to an exemplary embodiment of the present invention. The attribute information is an example of "first attribute information" according to an exemplary embodiment of the present invention.

In step S107, the first acquisition unit 201 stores the history information 351 and the attribute information received in step S106 into a history table 231. This history table 231 is stored in advance in the storage unit 23.

Figures 8, 9:
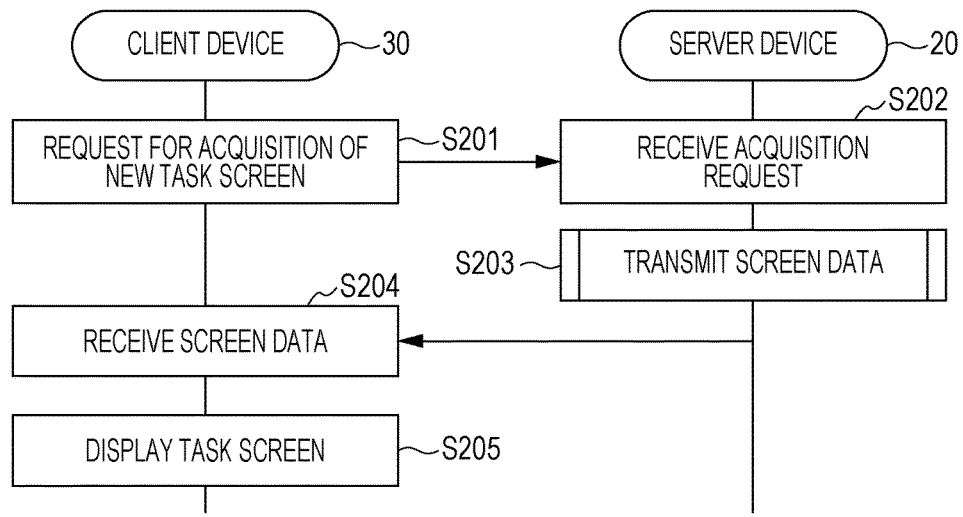
FIG. 8 illustrates an example of a history table.
FIG. 9 is a sequence diagram illustrating a task-screen providing process.

FIG. 8 illustrates an example of the history table 231. The history table 231 has history information and attribute information stored therein. In this example, the bottommost recorded item has stored therein the history information 351 and the attribute information received from the client device 30A, namely, the time and date "2016/4/1 10:00", the operation content "download", the connection-destination information "https://example.aaa", the file "template.xdw", the division information "sales division", and the post information "regular".

The process described above from step S101 to step S105 is also performed in a client device or devices 30 other than the client device 30A. Therefore, history information is transmitted to the server device 20 from multiple client devices 30. The history table 231 has these pieces of history information accumulated therein.

2.2. Task-Screen Providing Process

As described above, the purchase requesting process may involve a process unique to the division to which the user belongs or to the user's post. Such a process may possibly be performed by another user having the same attribute. Therefore, in accordance with the operation history of the user having the same attribute, this process includes generating a task screen to be provided to the user.

2.2.1. First Operation Example

FIG. 9 is a sequence diagram illustrating a task-screen providing process. It is assumed here that a user B uses one of the client devices 30 to make a request for acquiring a new task screen. The user B is a "regular" employee belonging to the "sales division". The user B is an example of a "first user" according to an exemplary embodiment of the present invention. In the following description, the client device 30 used by the user B will be referred to as "client device 30B". Each component of the client device 30B will be indicated by adding a suffix "B" to the reference sign thereof. This process commences when, for example, the user B performs an operation for making a request for acquiring a new task screen.

In step S201, the controller 31B transmits a request for acquiring a new task screen to the server device 20 via the communication unit 32B. The controller 31B is an example of a "second transmitter" according to an exemplary embodiment of the present invention. This acquisition request contains attribute information of the user B. The attribute information of the user B is acquired from the management device 10 by, for example, a method similar to that in step S102 described above. In this example, the attribute information acquired contains user's division information of "sales division" and user's post information of "regular". Then, the acquisition request containing this attribute information is transmitted.

In step S202, the second acquisition unit 202 receives this acquisition request via the communication unit 22. The attribute information contained in this acquisition request is an example of "second attribute information" according to an exemplary embodiment of the present invention.

In step S203, the server device 20 performs a screen-data transmitting process.

Figure 10:
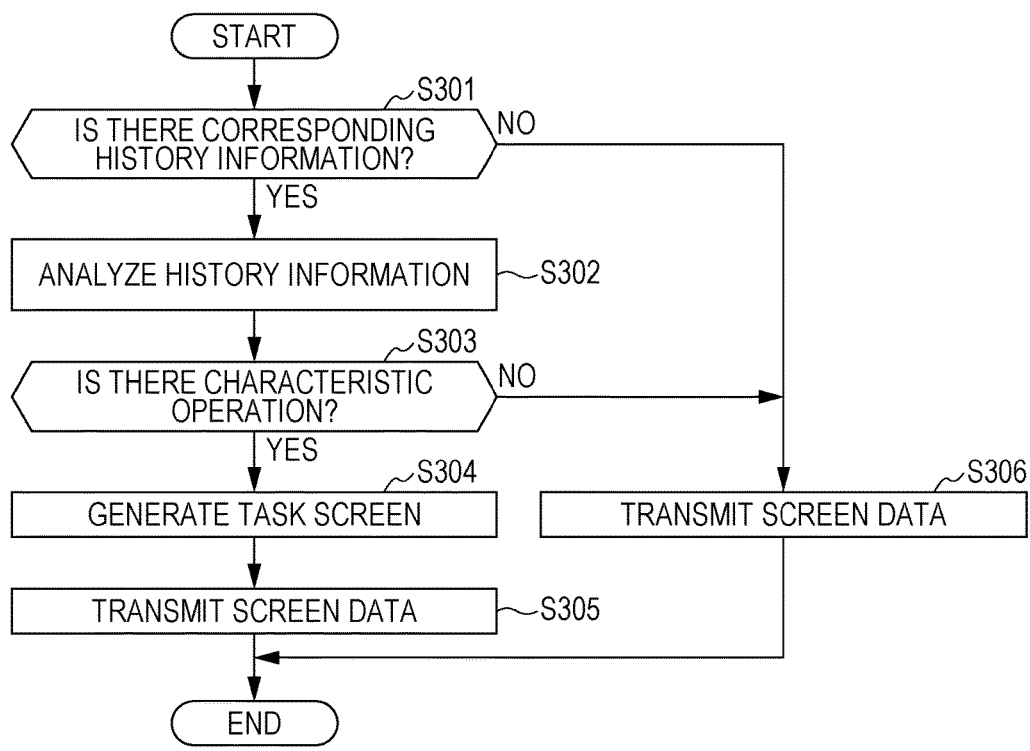
FIG. 10 is a flowchart illustrating a screen-data transmitting process.

FIG. 10 is a flowchart illustrating the screen-data transmitting process.

In step S301, the analyzing unit 203 determines whether or not there is history information corresponding to the attribute information of the user B. Specifically, the analyzing unit 203 first extracts the attribute information from the acquisition request. In this example, the division information "sales division" and the post information "regular" are extracted. Then, the analyzing unit 203 determines whether or not the extracted attribute information is included in the history table 231. If the extracted attribute information is not included in the history table 231, the analyzing unit 203 determines that there is no history information corresponding to the attribute information of the user B (NO in step S301). In this case, the process proceeds to step S306.

In contrast, in this example, as shown in FIG. 8, the division information "sales division" and the post information "regular" are included in the history table 231. In the case where the extracted attribute information is included in the history table 231 in this manner, the analyzing unit 203 determines that there is history information corresponding to the attribute information of the user B (YES in step S301). In this case, the process proceeds to step S302.

In step S302, the analyzing unit 203 analyzes the history information stored in the history table 231. Specifically, for each combination of division information and post information, the calculating unit 206 calculates the number of times each operation included in the history is performed (referred to as "the number of operations" hereinafter). This number of operations is an example of an "index value" according to an exemplary embodiment of the present invention. The analyzing unit 203 generates an analysis result 232 including the number of operations calculated by the calculating unit 206. In this analysis result 232, the history information corresponding to each operation and the number of operations are stored in association with each other.

FIG. 11 illustrates an example of the analysis result 232 of the history information. In this analysis result 232, the number of operations corresponding to the operation content "download", the connection-destination information "https://example.aaa", the file "template.xdw", the division information "sales division", and the post information "regular" is "200 times". This indicates that the operation for downloading the file "template.xdw" from the storage location indicated by the URL "https://example.aaa" has been performed for a total of 200 times by a regular employee belonging to the sales division.

Referring back to FIG. 10, in step S303, the analyzing unit 203 determines whether or not there is an operation characteristic of a user having the same attribute as the user B. Specifically, based on the analysis result 232 generated in step S302, the analyzing unit 203 determines whether or not the number of operations performed by the user having the same attribute as the user B, that is, a regular employee belonging to the sales division, is larger than or equal to a first threshold value. This user having the same attribute is an example of a "second user" according to an exemplary embodiment of the present invention. In this example, the first threshold value is set in advance to 100 times.

If the number of operations included in the history is smaller than the first threshold value, the specifying unit determines that there is no operation characteristic of the user having the same attribute as the user B (NO in step S303). In this case, the process proceeds to step S306.

It is clear from the analysis result 232 shown in FIG. 11 that the operation for downloading the file "template.xdw" from the storage location indicated by the URL "https://example.aaa" has been performed for a total of 200 times by a regular employee belonging to the sales division. This value of 200 times of operations is larger than or equal to the first threshold value. If an operation the number of times of which is performed more than or equal to the first threshold value is included in the history in this manner, the analyzing unit 203 determines that there is an operation characteristic of the user having the same attribute as the user B (YES in step S303). In this case, the analyzing unit 203 specifies this characteristic operation. In this example, the operation for downloading the file "template.xdw" from the storage location indicated by the URL "https://example.aaa" is specified. The process then proceeds to step S304.

In step S304, the generating unit 204 generates a new task screen 342 in accordance with the operation characteristic of the user having the same attribute as the user B. The new task screen 342 is an example of a "second screen" according to an exemplary embodiment of the present invention. Specifically, the storage unit 23 stores therein screen data indicating the standard purchase-request task screen 341 generated in advance. The generating unit 204 adds an icon related to the operation specified in step S303 onto the standard task screen 341 so as to generate the new task screen 342.

Figure 12:
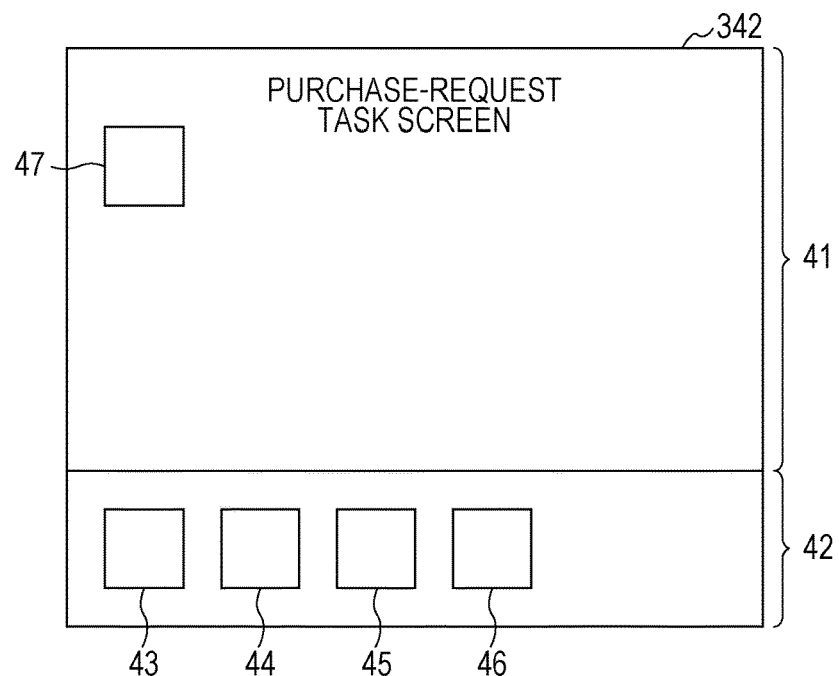
FIG. 12 illustrates an example of a new task screen.

FIG. 12 illustrates an example of the new task screen 342. In this example, an icon 47 linked with the file "template.xdw" is added to the file region 41. This icon 47 is used for opening the file "template.xdw". The icon 47 is an example of a "first operation image" according to an exemplary embodiment of the present invention.

Referring back to FIG. 10, in step S305, the transmitting unit 205 transmits screen data indicating the task screen 342 generated in step S304 to the client device 30B via the communication unit 22. In contrast, if the determination result obtained in step S301 or S303 described above indicates NO, the process proceeds to step S306.

In step S306, the transmitting unit 205 transmits the screen data indicating the standard purchase-request task screen 341 to the client device 30B via the communication unit 22. Specifically, this screen data is stored in the storage unit 23. The transmitting unit 205 reads this screen data from the storage unit 23 and transmits the screen data to the client device 30B via the communication unit 22.

Referring back to FIG. 9, in step S204, the controller 31B receives the screen data transmitted from the server device 20 via the communication unit 32B.

In step S205, the controller 31B causes the display unit 34B to display the task screen 341 or 342 based on the received screen data. For example, if the task screen 342 shown in FIG. 12 is to be displayed, the file region 41 of the task screen 342 includes the icon 47. If the user B desires to use a template for an approval document, the user B operates the operable unit 33B to open the file by using the icon 47. This operation is performed by, for example, double-clicking on the icon 47. Consequently, a template for an approval document contained in the file "template.xdw" is displayed on the display unit 34B.

2.2.2. Second Operation Example

It is assumed here that a user C uses one of the client devices 30 to make a request for changing to a new task screen. The user C is an employee in a "manager" post belonging to a "development division". The user C is an example of a "first user" according to an exemplary embodiment of the present invention. In the following description, the client device 30 used by the user C will be referred to as "client device 30C". Each component of the client device 30C will be indicated by adding a suffix "C" to the reference sign thereof.

In this case, in step S201 described above, an acquisition request containing attribute information of the user C, namely, user's division information "development division" and user's post information "manager", is transmitted. The attribute information of the user C is an example of "second attribute information" according to an exemplary embodiment of the present invention. In step S301 described above, it is determined whether or not there is history information corresponding to the attribute information of the user C. In this example, as shown in FIG. 8, the history table 231 includes the division information "development division" and the post information "manager". In this case, it is determined that there is history information corresponding to the attribute information of the user C (YES in step S301).

In step S303 described above, it is determined whether or not there is an operation characteristic of a user having the same attribute as the user C. The user having the same attribute as the user C is an example of a "second user" according to an exemplary embodiment of the present invention. It is clear from the analysis result 232 shown in FIG. 11 that an operation for displaying the price list stored at the storage location indicated by the URL "https://example.bbb" has been performed for a total of 150 times by the manager belonging to the development division. This value of 150 times of operations is larger than or equal to the first threshold value. In this case, it is determined that there is an operation characteristic of the user having the same attribute as the user C (YES in step S303). Moreover, the operation for displaying the price list stored at the storage location indicated by the URL "https://example.bbb" is specified. In step S304 described above, a new task screen 343 corresponding to the specified operation is generated. The task screen 343 is an example of a "second screen" according to an exemplary embodiment of the present invention.

Figure 13:
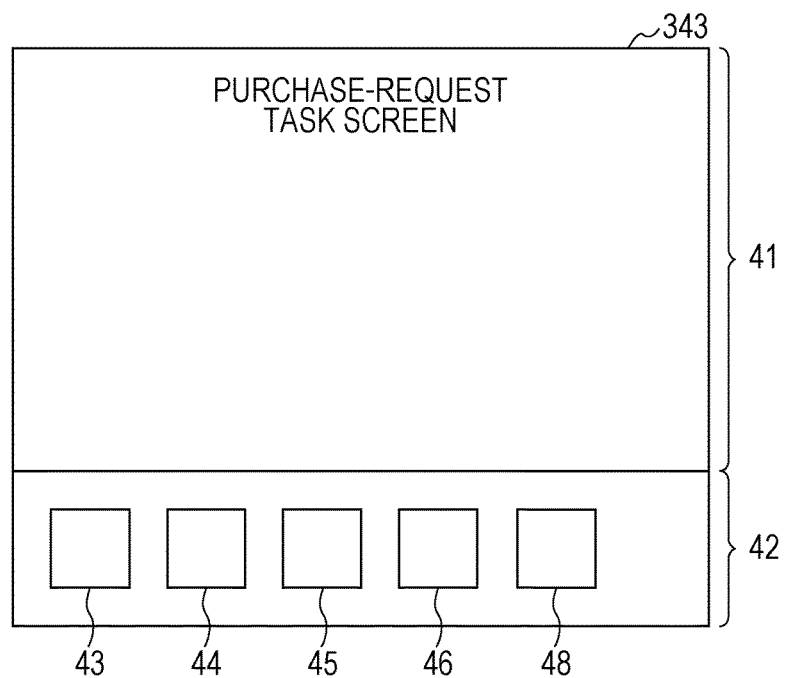
FIG. 13 illustrates an example of a new task screen.

FIG. 13 illustrates an example of the new task screen 343. In this example, a tool icon 48 linked with the URL "https://example.bbb" is added to the tool region 42. This tool icon 48 is used for displaying the price list stored at the storage location indicated by the URL "https://example.bbb". The tool icon 48 is an example of a "first operation image" according to an exemplary embodiment of the present invention.

In step S305 described above, screen data indicating this task screen 343 is transmitted to the client device 30C. In step S205 described above, the task screen 343 is displayed on the display unit 34C. For example, if the user C desires to browse the price list, the user C operates the operable unit 33C to execute a process by using the tool icon 48. This operation is performed by, for example, double-clicking on the tool icon 48. Consequently, the storage location indicated by the URL "https://example.bbb" is accessed, and the price list stored at this storage location is displayed on the display unit 34C.

When the task screen 342 shown in FIG. 12 and the task screen 343 shown in FIG. 13 are compared, the task screen 342 shown in FIG. 12 includes the icon 47, whereas the task screen 343 shown in FIG. 13 does not include the icon 47. This is because, although the number of times a regular employee in the sales division downloads the file "template.xdw" is large, the number of times the manager of the development division downloads this file is small (or zero). Furthermore, the task screen 343 shown in FIG. 13 includes the tool icon 48, whereas the task screen 342 shown in FIG. 12 does not include the tool icon 48. This is because, although the number of times the manager of the development division displays the price list stored at the storage location indicated by the "https://example.bbb" is large, the number of times this price list is displayed by a regular employee of the sales division is small (or zero).

According to the above exemplary embodiment, a task screen to be provided to a user is generated in accordance with the operation history of a user having the same attribute. This task screen includes an operation image to be used in an operation frequently performed by the user having the same attribute. By using this operation image, the number of steps involved in this operation is reduced, thereby allowing for improved operability. As a result, the user's task may progress smoothly.

Supposing that a task screen is generated for each user, the task-screen generating process is both time-consuming and costly. Since a task screen is not generated on a user-by-user basis in the above exemplary embodiment, the task-screen generating process is less time-consuming and less costly.

3. Modifications

The above exemplary embodiment is merely an example of the present invention. The exemplary embodiment may be modified as follows. Moreover, the following modifications may be combined.

3.1. First Modification

The tool-icon linking process is not limited to the process described in the above exemplary embodiment. For example, a mail composing process is also possible. For example, the sales division has the custom of a regular employee transmitting a mail to an approver in the approval requesting process. In this case, the regular employee in the sales division frequently transmits mails to this approver. It is assumed here that, in the first operation example described above, the number of times the regular employee in the sales division transmits mails to this approver is larger than or equal to the first threshold value.

In this case, in step S303 described above, it is determined that there is an operation characteristic of the user having the same attribute as the user B, and the operation for transmitting a mail to the approver is specified. In step S304 described above, a tool icon linked with a process of composing this mail is added so that the task screen 342 is generated. In step S205 described above, the task screen 342 is displayed on the display unit 34B of the client device 30B.

For example, if the user B desires to transmit a mail to the approver, the user B operates the operable unit 33B to compose a mail by using this tool icon. This operation is performed by, for example, double-clicking on the tool icon. Consequently, a mailer is activated so that a mail to the approver is composed. If the subject of the mail is preliminarily set, the preliminarily-set subject may be input to the subject of the composed mail.

3.2. Second Modification

If an icon (including a tool icon) is added to a task screen in the above exemplary embodiment, the usage status of the added icon may be fed back for generating a new task screen. For example, after an icon is added to a task screen, if this icon is not frequently used or if the icon is deleted from the task screen by many users, this icon may be deleted from the task screen.

The calculating unit 206 according to this modification calculates the number of times the operation using the icon added to the task screen is performed (referred to as "the number of usages") by the user having the same attribute and the number of times this icon is deleted from the task screen (referred to as "the number of deletions") by this user based on the history information and the attribute information stored in the history table 231. Based on the number of usages and the number of deletions calculated by the calculating unit 206, the analyzing unit 203 according to this modification generates a deletion table 233. The deletion table 233 is stored into the storage unit 23.

Figures 14, 15:
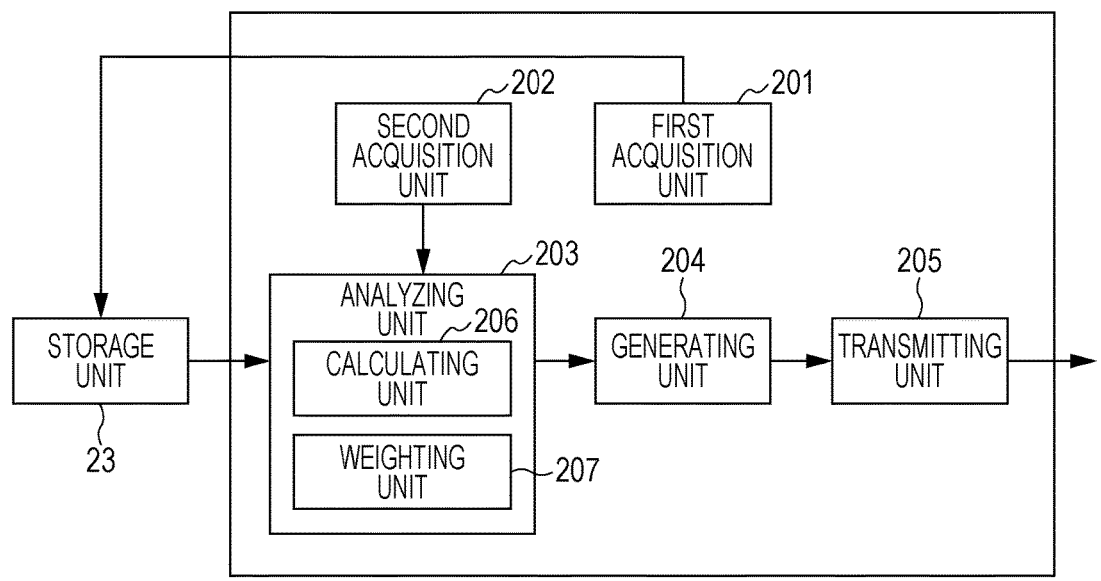
FIG. 14 illustrates an example of a deletion table according to a modification.
FIG. 15 illustrates a functional configuration of a server device according to a modification.

FIG. 14 illustrates an example of the deletion table 233. The deletion table 233 has stored therein an icon ID, division information, post information, the number of usages, and the number of deletions. The icon ID is information for identifying an icon. As shown in FIG. 14, in this example, the recorded item on the first row of the deletion table 233 has stored therein an icon ID "icon 47", division information "sales division", post information "regular", the number of usages of "two", and the number of deletions of "10". This indicates that an operation using the icon 47 has been performed for a total of two times by a regular employee in the sales division. Moreover, this also indicates that an operation for deleting the icon 47 from the task screen has been performed for a total of 10 times by the regular employer in the sales division.

It is assumed here that, after the task screen 342 including the icon 47 is provided to the client device 30B in the above-described first operation example, the user B makes a request for acquiring a new task screen again. In this case, based on the deletion table 233, the analyzing unit 203 according to this modification specifies an icon the number of usages of which is smaller than a second threshold value or the number of deletions of which is larger than or equal to a third threshold value. For example, if the number of usages of the icon 47 is smaller than the second threshold value, the icon 47 is specified.

The generating unit 204 according to this modification deletes the icon 47 from the task screen 342 so as to generate a new task screen. This task screen is an example of a "third screen" according to an exemplary embodiment of the present invention. The transmitting unit 205 according to this modification transmits screen data indicating the new task screen to the client device 30B via the communication unit 22. Consequently, the new task screen is displayed on the display unit 34B of the client device 30B. This task screen does not include the icon 47.

3.3. Third Modification

Although the above exemplary embodiment relates to an example in which an icon (including a tool icon) is added when generating a task screen, the task-screen generating method is not limited to this. For example, the order in which icons included in the standard task screen are arranged may be changed.

In the standard task screen 341 shown in FIG. 6, the tool icons 43 to 45 are arranged in the following order from the left: 43, 44, and 45. The tool icons 43 to 45 are normally used in the sequence of tool icons 43, 44, and 45. This sequence is an example of a "first sequence" according to an exemplary embodiment of the present invention. However, the tool icons 43 to 45 may sometimes be used in a different sequence depending on user's division or post. It is assumed here that a regular employee in the sales division uses the tool icons 43 to 45 in the following sequence: 43, 45, and 44. This sequence is an example of a "second sequence" according to an exemplary embodiment of the present invention.

In a case where a user having the same attribute uses the icons included in the standard task screen 341 in a sequence different from a predetermined sequence, the calculating unit 206 according to this modification calculates the number of times operations are performed using the icons in that sequence based on the history information and the attribute information stored in the history table 231.

If the number of times calculated by the calculating unit 206 is larger than or equal to a fourth threshold value, the analyzing unit 203 according to this modification specifies the aforementioned different sequence. It is assumed here that the number of times a regular employee in the sales division performs operations using the tool icons 43 to 45 included in the standard task screen 341 in the sequence of tool icons 43, 45, and 44 in the above-described first operation example is larger than or equal to the fourth threshold value. In this case, the sequence of tool icons 43, 45, and 44 is specified.

The generating unit 204 according to this modification rearranges the tool icons 43 to 45 included in the standard task screen 341 in the order of tool icons 43, 45, and 44 from the left so as to generate the task screen 342. Consequently, this task screen 342 is displayed on the display unit 34B of the client device 30B. In this task screen 342, the tool icons 43 to 45 are arranged in the following order from the left: 43, 45, and 44. Consequently, when the user B performs a purchase requesting process, the user B may simply use the tool icons 43, 45, and 44 in that sequence from the left, thereby allowing for improved operability.

3.4. Fourth Modification

Although the above exemplary embodiment relates to an example in which an icon (including a tool icon) is added when generating a task screen, the task-screen generating method is not limited to this. For example, an icon included in the standard task screen may be deleted therefrom.

Based on the history information and the attribute information stored in the history table 231, the calculating unit 206 according to this modification calculates the number of times each icon included in the standard task screen 341 is used (referred to as "the number of usages") by the user having the same attribute. An icon included in the standard task screen 341 is an example of a "second operation image" according to an exemplary embodiment of the present invention.

The analyzing unit 203 according to this modification determines whether or not the number of usages calculated by the calculating unit 206 is smaller than a fifth threshold value. It is assumed here that the number of times the tool icon 44 included in the standard task screen 341 shown in FIG. 6 is used by a regular employee in the sales division in the above-described first operation example is smaller than the fifth threshold value.

The generating unit 204 according to this modification deletes the tool icon 44 from the standard task screen 341 so as to generate a new task screen 342. Consequently, this task screen 342 is displayed on the display unit 34B of the client device 30B. This task screen 342 does not include the tool icon 44.

3.5. Fifth Modification

In the above exemplary embodiment, the calculating unit 206 may calculate the frequency at which an operation is performed, in place of the number of operations. For example, in the above-described first operation example, the frequency at which a regular employee in the sales division performs an operation for downloading the file "template.xdw" is calculated as follows.

First, based on the history information and the attribute information stored in the history table 231, the calculating unit 206 calculates the total number of times the aforementioned downloading operation is performed (referred to as "the number of downloads" hereinafter) by the regular employee in the sales division. Furthermore, based on the history information and the attribute information stored in the history table 231, the calculating unit 206 calculates the number of times the purchase-request task screen is displayed (referred to as "the number of displays" hereinafter) as a result of an operation performed by the regular employee in the sales division. Then, the calculating unit 206 calculates the ratio of the number of downloads to the number of displays. The ratio calculated in this manner is used as the frequency at which the aforementioned downloading operation is performed by the regular employee in the sales division. For example, if the number of displays is 250 times and the number of downloads is 200 times, the frequency is 200/250×100=80%.

3.6. Sixth Modification

In the above exemplary embodiment, with regard to an operation that satisfies a predetermined condition, an index value according to the number of operations thereof may be weighted. The predetermined condition may be a condition set based on, for example, the time and date on which the operation is performed or the operation content.

FIG. 15 illustrates a functional configuration of the server device 20 according to this modification. In addition to the functional configuration shown in FIG. 3, the server device 20 functions as a weighting unit 207. This weighting unit 207 is included in the analyzing unit 203. The weighting unit 207 assigns a weight to at least one index value calculated by the calculating unit 206 and corresponding to an operation that satisfies the predetermined condition.

It is assumed here that the predetermined condition is a condition in which an operation is performed in April. In this case, based on the time and date stored in the history table 231, the weighting unit 207 determines whether or not each operation included in the history is performed in April. Then, the weighting unit 207 assigns a weight to an index value that corresponds to an operation performed in April. This weighting process is performed by, for example, tripling the index value. Consequently, an operation that satisfies the predetermined condition may be readily specified as a characteristic operation.

3.7. Seventh Modification

In the above exemplary embodiment, the calculating unit 206 calculates the number of operations for each combination of division information and post information. Alternatively, the calculating unit 206 may calculate the number of operations for each piece of division information and the number of operations for each piece of post information. Consequently, the analysis result 232 includes, for example, the total number of times the operation for downloading the file "template.xdw" stored at the storage location indicated by the URL "https://example.aaa" is performed by all users belonging to the sales division and the total number of times this operation is performed by regular employees in all divisions. In other words, a user having the same attribute as the user may be a user whose all pieces of attribute information are the same as those of the user or a user whose attribute information is partially the same as that of the user. For example, a user having the same attribute as the user may be a user with the same division information alone or a user with the same post information alone.

Furthermore, the weighting process may be performed with respect to an index value corresponding to an operation performed by a user with the same division information as the user or an index value corresponding to an operation performed by a user with the same post information as the user. This weighting process is performed similarly to that in the sixth modification described above. For example, an index value corresponding to an operation performed by a user with the same division information as the user may be doubled. Consequently, for example, in the above-described first operation example, with regard to an operation not frequently performed by regular employees in all divisions, if the operation is frequently performed by users belonging to the sales division, the operation may be readily specified as a characteristic operation.

3.8. Eighth Modification

The method for acquiring attribute information of a user is not limited to the method described in the above exemplary embodiment. For example, the storage unit 35 of each client device 30 may have attribute information of a user or users in advance, and this attribute information may be transmitted to the server device 20. Alternatively, the server device 20 may acquire the attribute information from the management device 10. In this case, a user ID is transmitted from the corresponding client device 30 to the server device 20. The server device 20 may access the management device 10 and acquire the attribute information linked with the user ID received from the client device 30.

3.9. Ninth Modification

In the above exemplary embodiment, a user may have multiple pieces of division information or post information. For example, there are cases where a user belongs to two or more divisions. In this case, the user may have two or more pieces of division information.

3.10. Tenth Modification

In the above exemplary embodiment, a program to be executed by the CPU of the controller 21 and a program to be executed by the CPU of the controller 31 may be downloaded via the communication line 2, such as the Internet. Alternatively, these programs may be provided in a stored state in a computer-readable storage medium, such as a magnetic storage medium (e.g., a magnetic tape or a magnetic disk), an optical storage medium (e.g., an optical disk), a magneto-optical storage medium, or a semiconductor memory.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A server device comprising:
a memory; and
a central processing unit (CPU) programmed to:
acquire first history information and first attribute information, the first history information indicating a history of an operation performed during displaying of a first screen on a display of at least one client device, the first attribute information indicating an attribute of at least one user using the at least one client device,
wherein the memory stores the acquired first history information and the acquired first attribute information;
acquire second attribute information indicating an attribute of a first user using a first client device included in the at least one client device when the second acquisition unit receives an acquisition request for a new screen from the first client device;
perform an analysis of the first history information and the first attribute information stored in the memory, and specify an operation characteristic of a second user included in the at least one user and having an attribute indicated by the acquired second attribute information based on the analysis;
generate a second screen in accordance with the specified operation; and
transmit screen data indicating the generated second screen to the first client device, which includes a display for displaying the generated second screen.

2. The server device according to claim 1, wherein the CPU is further programmed to:
calculate at least one index value according to a number of times at least one operation included in the history is performed by the second user based on the first history information and the first attribute information stored in the memory; and
specify an operation the calculated index value of which is larger than or equal to a first threshold value, the operation being included in the at least one operation, and
wherein the second screen includes a first operation image related to the specified operation.

3. The server device according to claim 2, wherein if the specified operation is an operation for acquiring a file, the first operation image is linked with the file and is used for an operation for opening the file.

4. The server device according to claim 2, wherein if the specified operation is an operation for executing a process, the first operation image is linked with the process and is used for an operation for executing the process.

5. The server device according to claim 2, wherein the CPU is further programmed to:
assign a weight to an index value included in the calculated at least one index value and corresponding to an operation that satisfies a predetermined condition.

6. The server device according to claim 2, wherein the CPU is further programmed to:
acquire second history information indicating a history of an operation performed during displaying of the second screen on the display of the first client device,
wherein the memory stores the acquired second history information;
calculate a number of times the first operation image is used by the second user or a number of times the first operation image is deleted by the second user based on the second history information and the first attribute information stored in the memory;
if the calculated number of times the first operation image is used by the second user is smaller than a second threshold value or if the calculated number of times the first operation image is deleted by the second user is larger than or equal to a third threshold value, delete the first operation image from the second screen, and generate a third screen that does not include the first operation image; and
transmit screen data indicating the generated third screen to the first client device, to display the generated third screen on the display of the first client device.

7. The server device according to claim 1,
wherein the first screen includes a plurality of operation images used in a plurality of operations,
wherein the CPU is further programmed to:
calculate a number of times the plurality of operations are performed by the second user in a second sequence different from a predetermined first sequence based on the first history information and the first attribute information stored in the memory; and
if the calculated number of times the plurality of operations are performed in the second sequence is larger than or equal to a fourth threshold value, specify the second sequence,
wherein the second screen is generated by changing an order in which the plurality of operation images included in the first screen are arranged in accordance with the specified second sequence.

8. The server device according to claim 1,
wherein the first screen includes a second operation image related to a predetermined operation,
wherein the CPU is further programmed to:
calculate a number of times the second operation image is used by the second user based on the first history information and the first attribute information stored in the memory; and
if the calculated number of times the second operation image is used by the second user is smaller than a fifth threshold value, specify the second operation image, and
wherein the second screen is generated by deleting the second operation image from the first screen.

9. An information processing system comprising:
a server device; and
at least one client device used by at least one user,
wherein the at least one client device includes:
a display that displays a first screen;
a first memory that stores first history information indicating a history of an operation performed during displaying of the first screen; and
a first central processing unit (CPU) programmed to transmit the first history information stored in the first memory to the server device,
wherein the server device includes:
a second CPU programmed to acquire the first history information received from the at least one client device and first attribute information indicating an attribute of the at least one user; and
a second memory that stores the acquired first history information and the acquired first attribute information,
wherein the first CPU of a first client device included in the at least one client device is further configured to transmit an acquisition request for a new screen to the server device, and
wherein the second CPU of the server device is further programmed to:
acquire second attribute information indicating an attribute of a first user using the first client device when the acquisition request from the first client device is received;

perform an analysis of the first history information and the first attribute information stored in the memory, and specify an operation characteristic of a second user included in the at least one user and having an attribute indicated by the acquired second attribute information based on the analysis;

generate a second screen in accordance with the specified operation; and transmit screen data indicating the generated second screen to the first client device, which includes a display for displaying the generated second screen.

10. A non-transitory computer readable medium storing a program causing a computer to execute a process, the process comprising:

acquiring first history information and first attribute information, the first history information indicating a history of an operation performed during displaying of a first screen on a display of at least one client device, the first attribute information indicating an attribute of at least one user using the at least one client device;

causing a memory to store the acquired first history information and the acquired first attribute information;

acquiring second attribute information indicating an attribute of a first user using a first client device included in the at least one client device when an acquisition request for a new screen is received from the first client device;

performing an analysis of the first history information and the first attribute information stored in the memory, and specifying an operation characteristic of a second user included in the at least one user and having an attribute indicated by the acquired second attribute information based on the analysis;

generating a second screen in accordance with the specified operation; and transmitting screen data indicating the generated second screen to the first client device, which includes a display for displaying the generated second screen.

11. An information processing method implemented by a computer, the method comprising:

acquiring first history information and first attribute information, the first history information indicating a history of an operation performed during displaying of a first screen on a display of at least one client device, the first attribute information indicating an attribute of at least one user using the at least one client device;

causing a memory to store the acquired first history information and the acquired first attribute information;

acquiring second attribute information indicating an attribute of a first user using a first client device included in the at least one client device when an acquisition request for a new screen is received from the first client device;

performs an analysis of the first history information and the first attribute information stored in the memory, and specifying an operation characteristic of a second user included in the at least one user and having an attribute indicated by the acquired second attribute information based on the analysis;

generating a second screen in accordance with the specified operation; and transmitting screen data indicating the generated second screen to the first client device, which includes a display for displaying the generated second screen.

* * * * *